United States Patent
Altshuller et al.

(10) Patent No.: US 7,561,692 B2
(45) Date of Patent: Jul. 14, 2009

(54) METHOD OF AUTHENTICATING MOBILE TERMINAL

(75) Inventors: Mark Altshuller, Netanya (IL); Oleg Marinchenco, Modein (IL); Leonid Shousterman, Herzlia (IL)

(73) Assignee: Alvarion Ltd., Tel-Aviv (IL)

( * ) Notice: Subject to any disclaimer, the term of this patent is extended or adjusted under 35 U.S.C. 154(b) by 0 days.

(21) Appl. No.: 11/362,372

(22) Filed: Feb. 27, 2006

(65) Prior Publication Data

US 2007/0201697 A1 Aug. 30, 2007

(51) Int. Cl.
*H04K 1/00* (2006.01)
(52) U.S. Cl. .................. 380/247; 455/411; 455/436; 370/465; 713/153; 713/168; 726/12
(58) Field of Classification Search .......... 380/247
See application file for complete search history.

(56) References Cited

U.S. PATENT DOCUMENTS

| | | | | |
|---|---|---|---|---|
| 6,298,383 | B1* | 10/2001 | Gutman et al. | 709/229 |
| 6,633,760 | B1* | 10/2003 | Ham et al. | 455/422.1 |
| 7,113,793 | B2* | 9/2006 | Veerasamy et al. | 455/456.1 |
| 2002/0072358 | A1* | 6/2002 | Schneider et al. | 455/423 |
| 2003/0092444 | A1* | 5/2003 | Sengodan et al. | 455/436 |
| 2003/0108007 | A1* | 6/2003 | Holcman et al. | 370/331 |
| 2003/0211843 | A1* | 11/2003 | Song et al. | 455/411 |
| 2004/0048614 | A1* | 3/2004 | Ham et al. | 455/433 |
| 2006/0195893 | A1* | 8/2006 | Caceres et al. | 726/8 |

OTHER PUBLICATIONS

Braun et al., "Efficient Authentication and Authorization of Mobile Users Based on Peer-to-Peer Network Mechanisms", IEEE 2005, pp. 1-8.*
"WiMAX End-to-End Network Systems Architecture", WiMAX Forum, Sep. 15, 2005, pp. 52-179.*
"WiMAX End-to-End Network Systems Architecture (State 2: Architecture Tenets, Reference Model and Reference Points)", WiMAX Forum, Sep. 15, 2005.
"R3MM-SEC Anchored Authenticator model contribution Alvarion", WiMAX Forum Network Working Group, Apr. 10, 2005.
"R3MM-SEC Location of access-authenticator Alvarion-proposed option", WiMAX Forum Network Working Group, Mar. 29, 2005.

* cited by examiner

*Primary Examiner*—Emmanuel L Moise
*Assistant Examiner*—Shewaye Gelagay
(74) *Attorney, Agent, or Firm*—Browdy and Neimark, P.L.L.C.

(57) ABSTRACT

A method for authenticating a mobile terminal in a wireless network is disclosed. The method includes transmitting a request for authenticating the mobile terminal in that wireless network operative to provide services at a location where the mobile terminal is currently present, receiving the request at a base station associated with that wireless network, and determining an entity associated with the wireless network to be operative as a single authentication access entity for that mobile terminal, as long as the mobile terminal location remains within that wireless network and traffic is directed through any location associated with that wireless network.

8 Claims, 10 Drawing Sheets

METHOD OF AUTHENTICATING MOBILE TERMINAL

FIELD OF THE INVENTION

The present invention relates to mobile wireless communications and, in particular, to the authentication of mobile terminals in mobile IP based wireless communications systems.

LEGEND

The following are the meanings of certain abbreviations used hereinafter in the description of the invention:
AAA—Authentication, Authorization and Accounting
AKn—Acknowledge message
ASN—Access Service Network
BS—Base Station
CSN—Connectivity Service Network
DHCP—Dynamic Host Configuration Protocol
DP—Decision Point (Logical Point located in the ASN GW, and is operative to identify ASN control functions such as authentication)
EAP—Extensible Authentication Protocol
EP—Enforcement Point (Logical Point located in the ASN GW, and is operative to identify ASN bearer functions such FA (Foreign Agent), ASN data path function, and the like
GW—Gateway
HO—Handover
IP—Internet Protocol
MSS—Mobile Subscriber Station (also used as mobile terminal)
NAP—Network Access Provider
NAS—Network Access Server
QoS—Quality of Service
PMIP—Proxy Mobile IP
PMK—Primary Master Key

BACKGROUND OF THE INVENTION

Mobile units, e.g. telephones, laptop computers, etc. are known to be able to roam in wireless networks between various locations. Still, while roaming through various networks and sub-networks they need to maintain their connectivity. Various aspects relating to this mode of operation were suggested by the IETF ("Internet Engineering Task Force") and are described in a series of RFC (Request for Comment) documents that will be further discussed.

EAP framework is used as basic mechanism for user and device authentication/authorization in wireless network (e.g. mobile WiMAX). RFCs 2904, 2905 and 2906 present an AAA architectural framework. RFC 3748 defines EAP framework for usage on PPP, wired 802 networks and wireless LAN networks. The standardization body of mobile WiMAX has adopted EAP authentication framework as a suitable solution.

EAP framework relates to three entities which are associated with the authentication procedure:
  Supplicant—an entity that resides in the user/device terminal
  Authenticator—resides in ASN and relates to the NAS.
  Authentication Server—AAA server As will be appreciated by those skilled in the art, one of the problems characterizing mobile networks is, that mobile nodes may replace rather frequently their respective traffic attachment points (as they are typically associated with the corresponding NAS) in the access network. This problem is more common for distributed networks, in which the network access server (NAS) may reside in any of the base stations associated with a specific network.

Our co-pending application U.S. Ser. No. 11/175,384 (published as U.S. Patent Application No. 2007/0008900) describes a method for use in a mobile wireless access network for providing secure mobile IP services to a mobile terminal, which is based on creating a virtual anchored node at an access network (ASN) associated with the mobile terminal and with a logical Access Network Server ("NAS"), where the anchored node communicates with the other elements associated with the access network (ASN) (e.g. BS and the NAS part which takes care after the conveyed traffic).

Some methods disclosed in the prior art, deal with the problem of authenticating a session being established with a mobile terminal that is moving around, but they do not provide an adequate solution to the problem of how to single out the appropriate NAS, through which it would be possible to communicate with that mobile terminal. This problem is experienced in numerous occasions such as when a mobile terminal has to communicate through using another Access Server Network Gateway ("ASN GW") while moving within the same access network, etc.

In addition, the solutions known in the art for replacing the authenticating entity together with traffic attachment point are cumbersome and not efficient enough, as they require carrying out full authentication processes of the terminal.

The disclosure of the references mentioned throughout the present specification are hereby incorporated herein by reference in their entireties and for all purposes.

SUMMARY OF THE INVENTION

It is an object of the present invention to provide a method that allows reducing time required for Inter-ASN and Intra-NAP MSS Hand Over procedure.

It is another object of the present invention to provide a method that improves MSS-to-Home AAA server authentication process during intra-NAP mobility scenarios, thus reducing the number of full re-authentications required while a mobile terminal is under control of the same NAP provider.

Other objects of the invention will become apparent as the description of the invention proceeds.

According to an embodiment of the present invention, there is provided a method for authenticating a mobile terminal in a first wireless network. The method comprises the steps of:
  transmitting a request for authenticating the mobile terminal in the first wireless network, wherein the first wireless network is operative to provide services at a location where the mobile terminal is currently present;
  receiving the request at a first base station associated with the first wireless network; and
  determining an entity associated with the first wireless network to be operative as a single authentication access entity for the mobile terminal, as long as the mobile terminal location remains within the first wireless network.

Following the step of determination, a process of authenticating the mobile terminal is preferably carried out.

According to another preferred embodiment of the invention, the single authentication access entity is associated with a first network access server that is operative to communicate with the first base station. Preferably, the first network access server is an access service network gateway ("ASN GW").

According to yet another embodiment of the invention, the method provided further comprises a step of initiating a hand over procedure to enable the mobile terminal currently serviced by the first base station, to be serviced by a second base station, and wherein the first access service network gateway is different from a second access service network gateway ("ASN GW") with which the second base station is associated.

By yet another preferred embodiment, the single authentication access entity is comprised in the first network access server, whereas traffic directed towards (or from) the mobile terminal is conveyed via a second network access server, e.g. the single authentication access entity is comprised in one gateway while the traffic to/from the mobile terminal is conveyed via a second gateway.

According to still another embodiment of the invention, the method further comprising a step of informing (or providing an indication to) the second base station which is the single authentication access entity, and/or its locations, for example, that it is comprised in the first ASN GW. This identification shall preferably reside as part of the mobile terminal context in the serving network elements (e.g. Serving BS, ASN GW), to allow identifying the location of the authentication entity.

By yet another embodiment of the invention, the method further comprising a step that in the event of uncontrolled disconnection of communication held with the mobile terminal occurs, the second base station initiates a transmission of a message, informing the single authentication access entity of the uncontrolled disconnection.

Preferably, the message is transmitted after a certain time out period having a pre-defined length of time, has expired.

According to still another embodiment of the invention, the method provided further comprises the step of initiating a network re-entry procedure for the mobile terminal following the occurrence of an uncontrolled disconnection event. Preferably, the network re-entry procedure comprises the step of receiving an indication from a base station through which the re-entry procedure has been initiated, and authenticating the mobile terminal while using the single authentication access entity.

According to yet another preferred embodiment, the method further comprises a step of storing accounting information related to actions taken by the mobile terminal in the single authentication access entity.

DETAILED DESCRIPTION OF THE INVENTION

A better understanding of the present invention is obtained when the following non-limiting detailed description is considered in conjunction with the following drawings.

One of the main objects of the present invention is to provide a method for optimizing MSS-to-Network Authentication behavior during certain mobility scenarios through the use of an Anchored Authenticator (Anchored NAS) model.

The implementation of Anchored Authenticator model in accordance with the present invention enables among others the following advantages:

Optimization of inter-ASN intra-NAP mobility (reduce the time required for Inter-ASN Intra-NAP MSS Hand Over); and Optimization of MSS-to-Home AAA server authentication process during intra-NAP mobility scenarios (reduce the number of full EAP re-authentications while MSS is under control of the same NAP provider).

Although the present invention does not relate in details to the IP address allocation process, this latter process may be carried out using any applicable method know in the art per se, such as MIP, Proxy MIP or any other applicable scheme.

Reference Model

Figure 1:
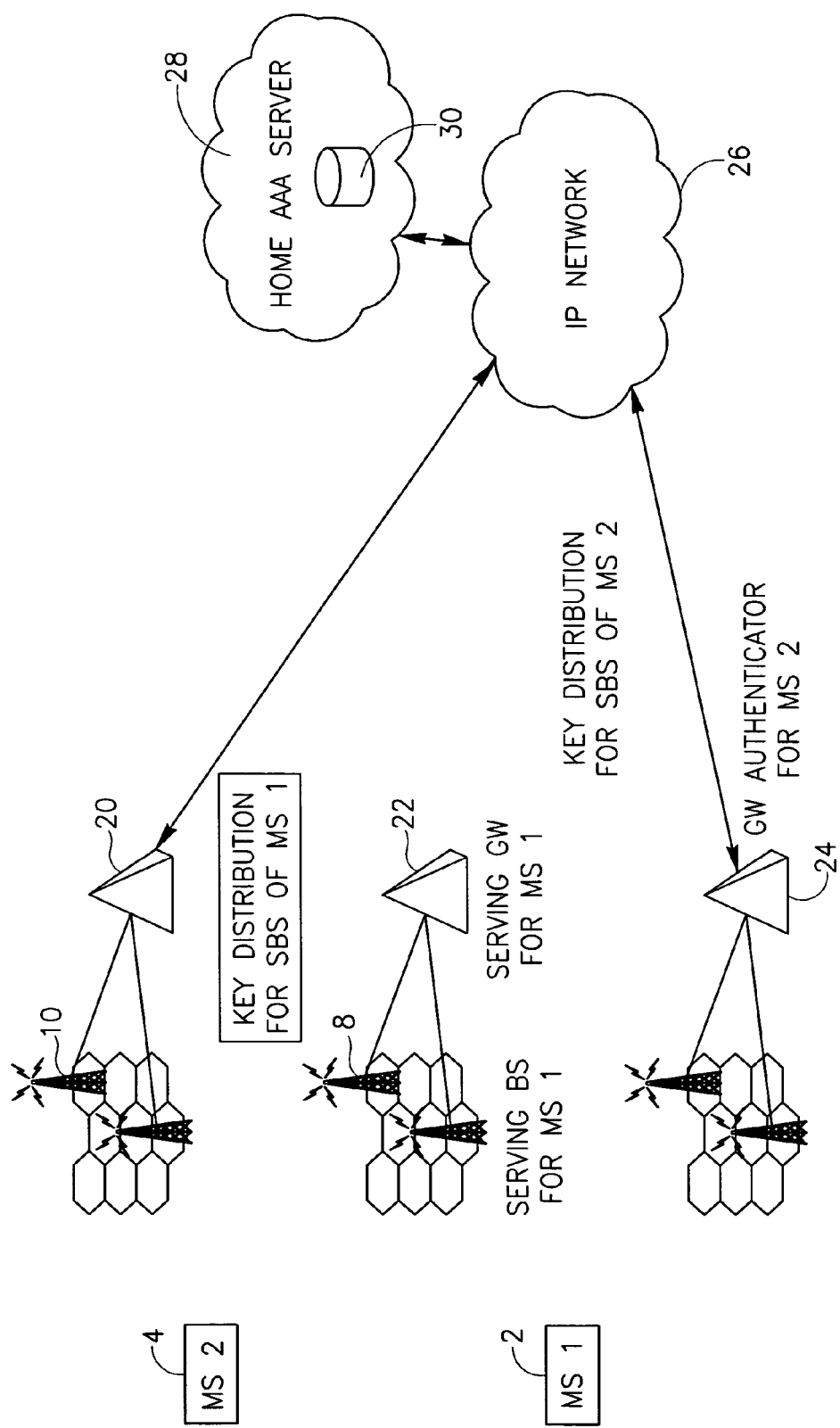
FIG. 1—presents an illustration of an Anchored Authenticator Reference Model exemplified by the present invention.

The anchored authenticator reference model referred to herein, is illustrated in FIG. 1. The architecture presented in this Figure is based on the WiMAX Forum NWG Generic Reference Model architecture, but with the difference that the ASN GW functionality has been divided (decomposed) here, into DP and EP logical or physical entities.

According to one embodiment of the invention, the EAP authenticator and AAA client functionalities are associated with ASN DP functional module (logical or physical entity) and will be referred to hereinafter as ASN DP even though ASN GW implementation may take place in a non-decomposed architecture.

The anchored authenticator reference model covers Inter-ASN Intra-NAP mobility scenarios and assumes that the EAP authenticator and AAA client for a specific MSS, are not relocated during Intra-NAP MSS mobility events (specifically Inter-ASN mobility).

For the sake of clarity, we shall introduce the following terminology for the anchored and serving ASN DP described below.

Functional Entities and Reference Points

The functional entities referred to hereinafter are described in more details in 050322_NWG_00_EAP_Proxy.doc ("EAP Proxy") of the WiMAX NWG. The new logical classification of ASN DP functional modules referred to in this application, relate to anchored and serving DPs. This classification is used on a per MSS basis.

The following functional entities involved in the procedures described herein, are adapted to carry out the following functionalities:

MSS—behaves as an EAP supplicant;

BS—behaves as an EAP Proxy (as presented in "EAP Proxy" contribution);

Serving BS—BS that is currently serving the MSS (maintains 802.16e radio link with the specific MSS);

Target BS—BS destined for MSS Hand Over;

Anchored ASN DP—ASN DP that behaves as an Anchored Authenticator for the specific MSS—the one that had proceeded with MSS-to-Network EAP authentication process and as a result of successful authentication received;

MSK/EMSK—key from Home AAA server (from which it derived and stored PMK-key associated with the specific supplicant);

Serving ASN DP—ASN DP that serves the MSS located in the current Serving BS but by itself is not the Anchored Authenticator for this MSS (it did not participate in MSS-to-Network authentication process and does not keep PMK key for this MSS). During HO process (to the BS it serves or between BSs it serves) it receives MS_Info message from the Target BS, requests AKn key from the Anchored ASN DP and is operative to forward same to the Target BS. According to the present invention, the Anchored BS may preferably exchange messages with Anchor ASN DP without involving Serving ASN DP. It should be noted however, that this element is an optional element in the architecture described herein.

V-AAA—AAA Server in the Visited CSN, behaves as a Proxy AAA server.

H-AAA—AAA Server in the Home CSN network, behaves as a Home Authentication Server for the specific MSS.

The following Reference Points are involved in the described procedures: R1, R6d, R3d and R4d with the same meaning as they have in: http://open.nbgisp.org/WIMAXE2EARCH/upload/TECHNICAL/FACE2FACE_MEETINGS/SEOUL_09032004/WiMAX NWG_Reference_Model_and_Functional_Decomposition_Priorities.ppt, referred hereinafter as the WiMAX NWG Generic Reference Model.

As will be appreciated by those skilled in the art, the R4d reference point in the present description is introduced in addition to the reference points related to in the "EAP Proxy" contribution (R4d refers to the set of control plane protocols for AAA, Policy and QoS Enforcement coordination between ASN DPs).

Functional Description

The following scenarios relate to the anchored authenticator solution behavior in accordance with the present invention:

Initial MSS Network Entry

Figure 2:
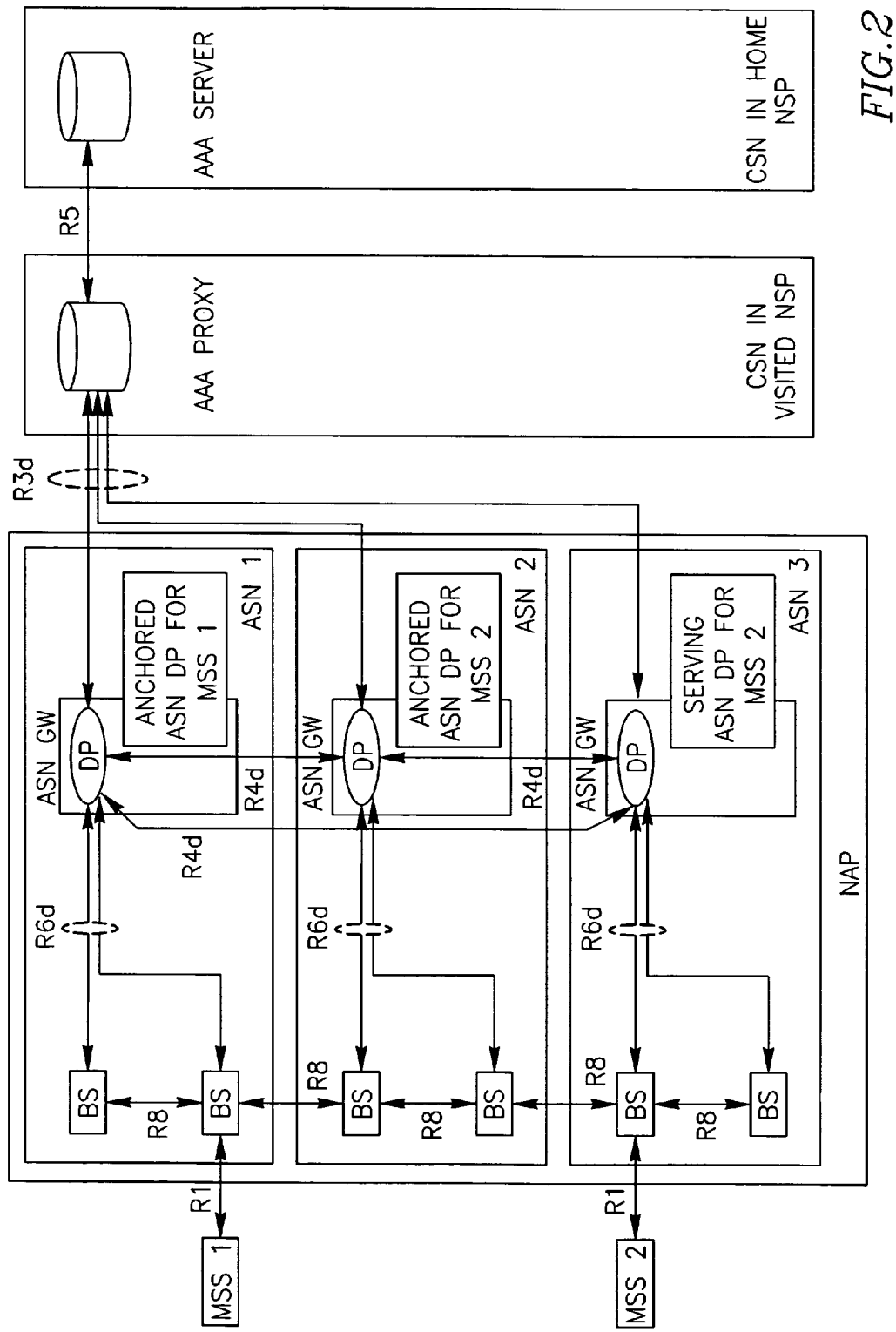
FIG. 2—presents an initial MSS-to-Network Authentication process.

Initial MSS network entry follows the procedure demonstrated in FIG. 2.

The EAP authenticator (ASN DP associated with the current Serving BS) initiates MSS-to-Network EAP authentication process. ASN DP forwards EAP messages from MSS to Visited AAA server in a visited CSN network which will consider the location of the MSS Home AAA server and behave as AAA Proxy. Alternatively, the ASN DP may take into account the location of the MSS Home AAA server and forward EAP messages directly thereto for MSS-to-Network authentication (in this scenario we assume that there are trust associations existing between the ASN DPs in the NAP and the Home AAA server in the Home CSN). From this point onward, the ASN DP behaves as an anchored ASN DP for that specific MSS.

Following a successful completion of the authentication process, the anchored ASN DP will preferably be provisioned with MSK/EMSK-key and relevant MSS info.

Inter-ASN Intra-NAP Mobility Management

In the case of MSS Hand Over to a Target BS served by another ASN GW, the anchored ASN DP should preferably have one or more of the following capabilities:

to signal to the serving ASN DP that it is the anchored ASN DP and should behave as the anchored authenticator for this specific MSS;

to store the current serving ASN DP location information;

to generate AKn for the target BS from PMK and provide such Akn to the serving ASN DP; and to provide the serving ASN DP with information related to the specific MSS (e.g. QoS credentials) excluding master keying information (PMK).

Preferably, the serving ASN DP stores any or all of the following details in its memory block allocated for the specific MSS:

indication that it is operative as a serving ASN DP;
indication of the location of the anchored ASN DP; and
information related to the specific MSS that was transferred from the Anchored ASN DP.

Figure 3:
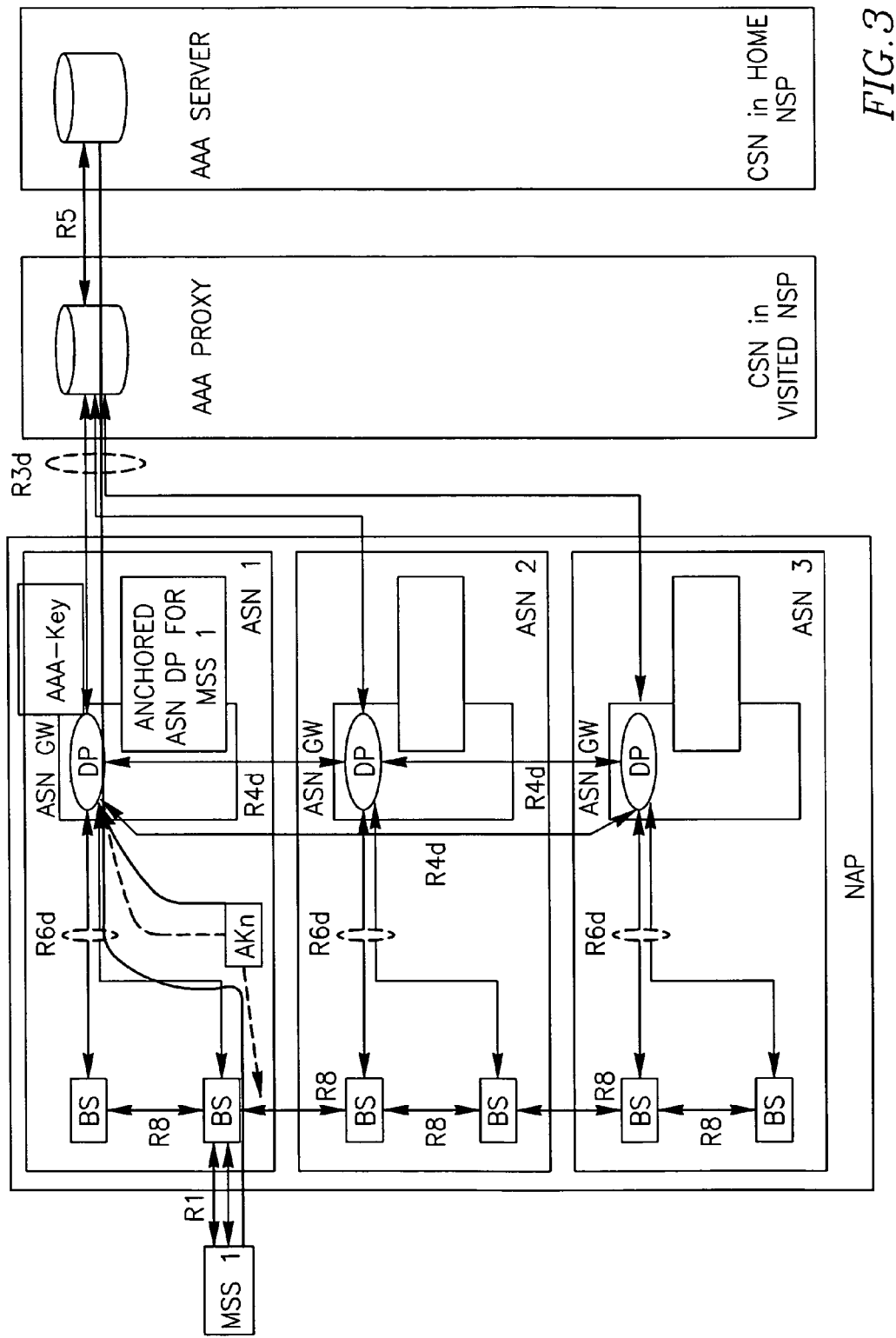
FIG. 3—illustrates inter ASN/intra NAP mobility provisioning in accordance with the present invention.
Figure 4:
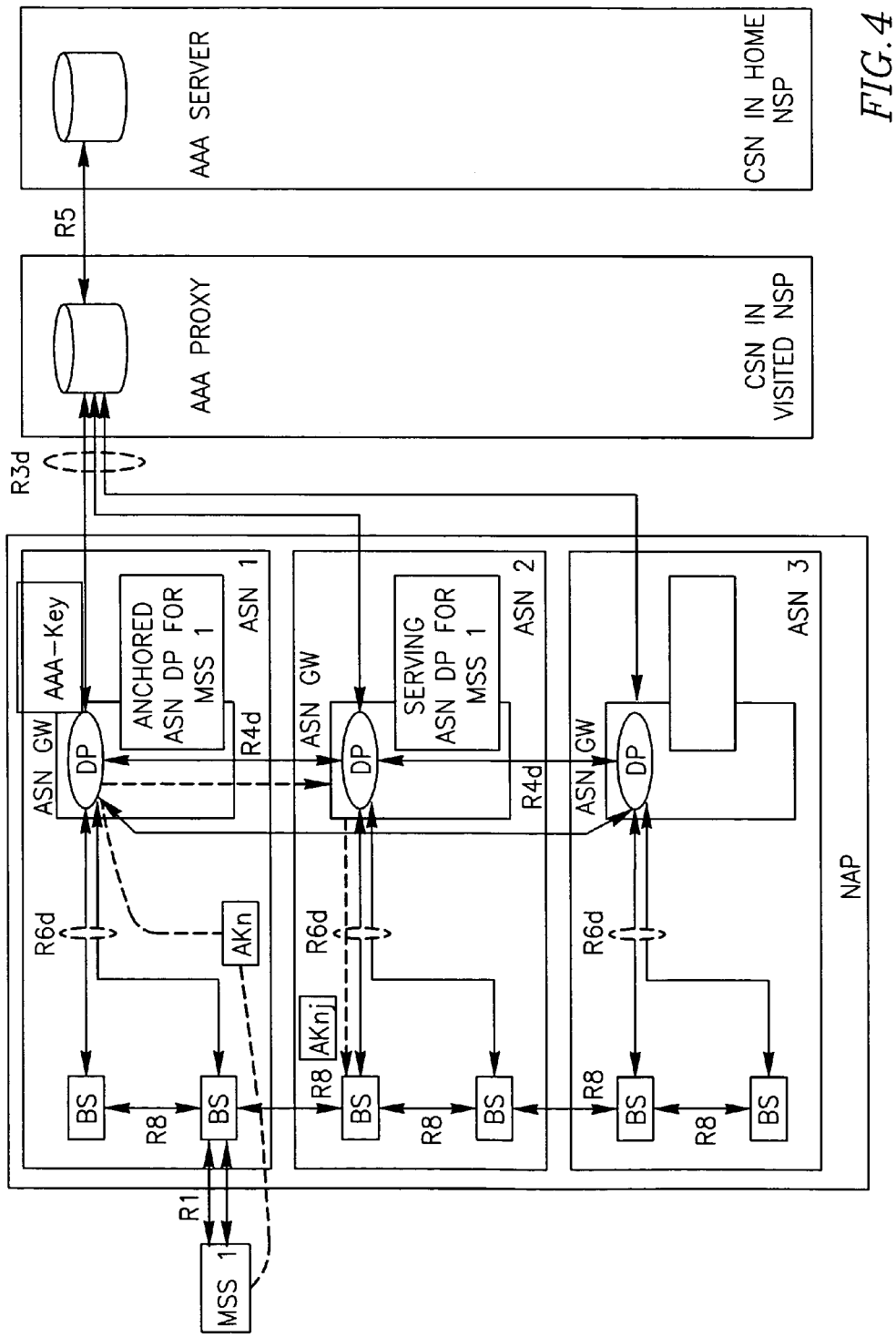
FIG. 4—illustrates another embodiment of inter ASN/intra NAP mobility provisioning in accordance with the present invention.

The communications carried between anchored and serving ASN DP could preferably be done by using R4d reference interface. An illustration of such an operation is presented in FIGS. 3 and 4.

The serving ASN DP should preferably also deliver AKn (received from the anchored ASN DP) to the target BS via R6d reference interface. The serving ASN DP should preferably not store keying information for the specific MSS but be able to provide it in a bypass mode.

When events of MSS Hand Over occur between base stations (BSs) served by the same serving ASN DP (Intra-ASN HOs), the serving ASN DP should preferably send a request to the anchored ASN DP for new keying information (AKn) that relate to the target BS.

When an event of MSS Hand Over occurs between serving BS served by the serving ASN DP and a target BS served by another (new) ASN DP (i.e. not the one of the current anchored or serving ASN DPs), the current serving ASN DP should preferably be able to carry out any or all of the following:

signal to the new ASN DP that the donor ASN GW is a serving ASN DP for this MSS;
provide the new ASN DP with location information of the anchored ASN DP for this MSS;
provide the new ASN DP with information related to the specific MSS;
update the anchored ASN DP about changing of the serving ASN GW location;
clear out the memory block storing information related to the specific MSS.

The new ASN DP should preferably store in its memory block allocated for the specific MSS, any or all of the following:

an indication that it is now a serving ASN DP for this MSS;
an indication of the location of the anchored ASN DP;
information related to the specific MSS transferred from the donor ASN DP.

The new serving ASN DP should preferably send a request to the anchored ASN DP to receive a new AKn-key associated with the target BS.

In the alternative, the target BS is preferably being provided with the option to request and receive Akn-key by communicating directly with the anchored ASN DP (using R6d reference point). In this case, the serving DP may be assumed to be collocated with the anchored ASN DP, but separated from the anchored traffic point (or serving ASN GW).

The communications between the ASN DPs are preferably carried out using R4d reference interface.

The new serving ASN DP should preferably also deliver AKn (received from the anchored ASN DP) to the target BS via R6d reference interface. Preferably, the serving ASN DP does not store keying information related to the specific MSS but is able to provide it in a bypass mode.

When the MSS Hand Over occurs between a BS served by the serving ASN DP and a target BS served by the anchored ASN DP, the current serving ASN DP preferably carries any or all of the following:

recognize that the target ASN DP is MSS's anchored ASN DP and indicate (e.g. signal) this fact to the target ASN DP; and clear out the memory block storing information related to the specific MSS.

On the other hand, the anchored ASN DP should preferably verify that it is the actually anchored authenticator for the specific MSS. The communications exchanged between the ASN DPs are preferably carried out by using R4d reference interface.

Preferably, the anchored ASN DP then generates AKn-key and delivers it to the target BS via R6d reference interface.

Optionally, during Inter-ASN Intra-NAP Hand Over, the anchored ASN DP may signal to the serving ASN DP the authenticator relocation request. This may result in authenticator relocation to the serving ASN DP. The current anchored ASN DP clears out its memory block from stored information relating to the specific MSS so that it becomes in fact idle in relation with this MSS. The serving ASN DP may then initiate a full EAP re-authentication process between the MSS and its home AAA server and then will become the anchored ASN DP.

Uncontrolled Disconnect

Figure 5:
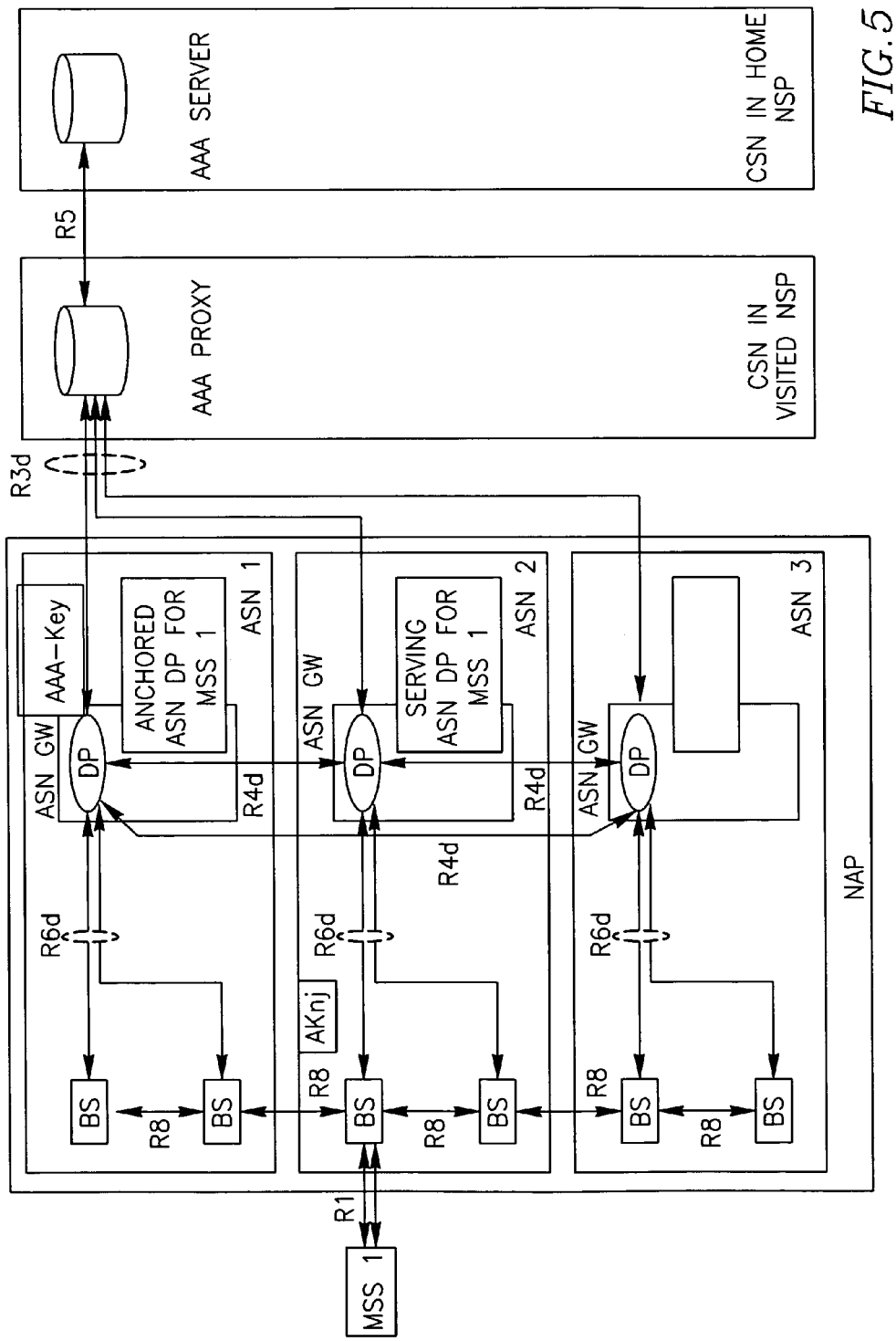
FIG. 5—illustrate uncontrolled inter ASN scenario.

The event of uncontrolled disconnect may occur as a result of radio interface (reference point R1) loss (e.g. link budget problems or MSS power down) or a failure of a network entity involved along the data path (e.g. BS, ASN GW EP or back-hauling infrastructure failure). An examples of handling these cases is illustrated in FIG. 5.

In case of radio interface loss, after the expiry of a time-out period (T re-entry in BS) the serving BS should preferably inform its ASN DP that a disconnection has occurred, by using R6d reference point. In case the ASN DP recognizes that it is the serving DP for this MSS, it will preferably update the anchored ASN DP about MSS disconnection using $R_4d$ reference point. The anchored ASN DP will then clear out all the relevant information about the specific MSS.

By another embodiment of the present invention, the serving BS may inform directly the anchor ASN DP that a disconnection occurred, without having to go through intermediate (serving) DP.

In case the ASN DP which receives a disconnect signal from the serving BS recognizes that it is the anchored ASN DP, it will preferably clear out all the relevant information about the specific MSS.

MSS Network Re-Entry

In case of a MSS network re-entry after uncontrolled disconnection, the new serving BS signals the MSS network entry to its preferred ASN DP (due to initial network configuration), which in turn initiates MSS-to-Network EAP authentication process. ASN DP resolves the location of MSS Home AAA server and forwards EAP messages thereto for authentication.

Optional Update of the Previously Anchored ASN DP

There are possible scenarios in which uncontrolled disconnection occurs but ASN DP is not updated about such disconnection, and consequently does not clear out the memory block related to the MSS (e.g. backhauling between BS and ASN GW failure scenario). The possible mechanism to recognize out-of-date records may be based on time-out or audit mechanism.

Alternatively, an update mechanism may be carried out via the Home AAA server. In such a case, Home AAA server should preferably store the location of the Anchored ASN DP during the authentication process. Thus, when an MSS re-enters an ASN network and new MSS-to-Network authentication process occurs, the Home AAA server may provide the new authenticator with a location of the previous anchored ASN DP (as a part of MSS info) and store a new location of the anchored ASN DP. The new Anchored ASN DP will update the old anchored ASN DP about the relocation of anchored authenticator for this MSS. The old Anchored ASN DP should then preferably clear out the memory block storing information related to this specific MSS.

Relocation of Anchored Authenticator

Relocation of the anchored authenticator for the specific MSS may occur as a result of any one or more of the following:

key refresh is required and the serving BS prefers working with another ASN DP

Serving ASN DP recognizes the long time intervals required to receive responses from the anchored ASN DP (T resp. time-outs expiry in the Serving ASN DP) e.g. as a result of ASN DP server load, network load or long distances between the serving and anchored ASN DPs)

Anchored Authenticator Relocation as a Result of a Required Master Key Refresh:

If the liveliness timer of the master key derived during the previous authentication process expires, the MSS may initiate EAP Re-authentication process to obtain a fresh key. The BS will forward EAP packets to its preferred ASN DP, which may be different from the anchored ASN DP (in this case it was performing serving ASN DP functions and the location of the previous Anchored ASN DP is known). The new ASN DP continues with the MSS-to-Network authentication process and becomes the new anchored authenticator (anchored ASN DP). The new anchored ASN DP should preferably update the old anchored ASN DP about the relocation of anchored authenticator for this MSS. The old anchored ASN DP will then preferably clear the stored information out of the memory block related to this specific MSS.

Anchored Authenticator Relocation as a Result of Long Latency in the Anchored ASN DP Responses:

In case the serving ASN DP observes delayed responses from the anchored ASN DP during AK request/response exchange for the specific MSS, it may initiate MSS-to-Network EAP Re-authentication process. As a result, the serving ASN DP will become the new anchored authenticator (anchored ASN DP) for this specific MSS. The new anchored ASN DP should preferably update the old anchored ASN DP about the relocation of anchored authenticator for this MSS. The old anchored ASN DP will then preferably clear the stored information out of the memory block related to this specific MSS.

Security Considerations

The security model as will be also further discussed hereinafter makes use of certain trust assumptions as known in the art, and makes the following additional assumption: the ASN domains are parts of the same Network Access Provider (NAP) network and there is a trust relationship established between ASN DPs within of the same NAP.

As previously explained, a preferred embodiment of the present invention is that each NAP is responsible for managing a single point of authentication/authorization proxy (e.g. an authenticator) for a given MSS. Still, this approach should be understood not to contradict a configuration whereby a plurality of authenticators per NAP are used, each of which is capable of managing the AAA process of a specific group of MSS's—in order to obtain better reliability and improved load balancing. On the other hand, the present invention possesses a number of advantages over the configuration suggested in the prior art where an authenticator follows the MSS traffic anchor point (e.g. ASN GW). The main advantages are:

Single physical entity (authenticator) in NAP network that communicates with the Home AAA server. This simplifies inter-provider network management/provisioning (and finally operational expenses of multi-provider roaming agreements) and simplifies network entities such as AAA server;

Single (per keying material lifetime) authentication/authorization process against Home AAA server corresponding to MSS network attach point (the specific NAP provider) is beneficial for the Home CSN provider rather than managing Re-authentication, each time R3MM Hand Over ("HO") occurs;

Reducing load on Home AAA server of insignificant AAA traffic (due to handling of AAA requests caused by HO) CAPEX savings;

Faster intra-ASN and inter-ASN (intra-NAP), reduced Hand Over times and optimized HO process—which all lead to better QoS;

Continuous maintenance of accounting record in the Home AAA server, which is not interrupted by intra-NAP HOs—hence less accounting post-processing resources are required in billing/mediation systems (CAPEX saving);

Ability (for a NAP provider) to keep accounting information for any specific MSS in a single network entity—useful for roaming inter-providers accounting (otherwise AAA proxy in NAP network might be needed).

Let us now consider the following examples demonstrating possible network configuration scenarios. The basic scenarios may be divided into:

Separate authenticator entity per NAP (like "DP in the box"); and

Authenticator being part of the ASN GW (with multiple ASN GWs in the NAP network))

We shall first consider an example where the NAS/authenticator is a single entity (per NAP) for any specific MSS. By this example, illustrated in FIG. 6, the NAS/authenticator may be collocated with ASN GW DP if the implementation assumes single ASN GW DP entity per NAP. The mobility provided to the MSS in accordance with this configuration involves further re-anchoring of ASN GW EP when appropriate (after PMIP client relocation to target ASN GW EP (ASN GW 2):

Step 1 (T1)—MSS communicates via BS (b) and ASN GW (1)

Step 2 (T2) (anchored HO)—MSS starts communicating with BS (c) and ASN GW EP (2) but the traffic flow is still anchored to ASN GW EP (1) which forwards it to ASN GW EP (2)

Step 3 (T3) (ASN GW HO)—PMIP client is transferred from ASN GW EP (1) to ASN GW EP (2) and ASN GW EP (2) becomes now the pivot. Since this process is performed after Anchored Handover, the signaling for ASN GW Handover may take as long as necessary and has no impact on traffic flow.

In the above scenario, the position of an Authenticator is static and does not change as long as MSS is under control of the specific NAP network (intra-NAP). On other words, there is no need to perform full re-authentication during additional intra-NAP Handovers. Authenticator will need to distribute the appropriate keying material (associated with PMK derived from MSS-to-Authentication Server authentication process and cashed by NAS/Authenticator) to appropriate BS's via R6_d interface.

Figure 7:
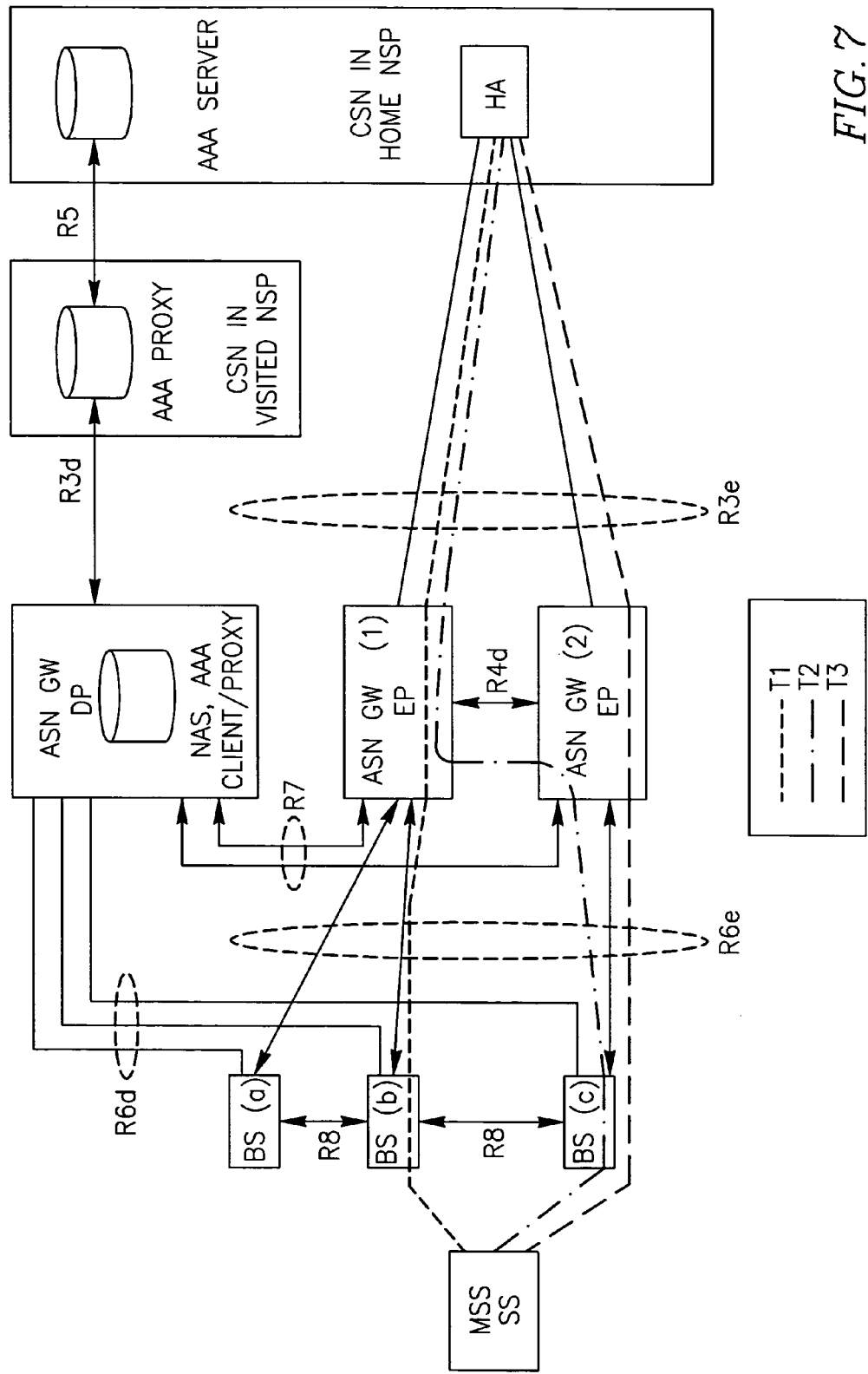
FIG. 7 presents a schematic illustration of another embodiment of the present invention where the NAS/Authenticator is located in each Access Server Network Gateway.

Next, the following example (illustrated in FIG. 7) is concerned with a NAS/authenticator which constitutes a part of the ASN GW (with multiple ASN GWs in the NAP network). In this example, NAS/Authenticator may be collocated with ASN GW DP (if logical decoupling to DP and EP is implemented). By this example, the MSS is registered once in a specific NAP, and the latter is anchored (logically for authentication purposes) to the specific authenticator associated with the ASN GW, which was serving the BS.

The main steps in the authentication process according to this example may be described in the following way:

MSS enters the network via BS (b) connected to ASN GW (1). As a part of registration process it performs Authentication using NAS/Authenticator located in ASN GW (1).

From this point of time and on, the NAS/Authenticator located in ASN GW (1) will be responsible to handle authentication/re-authentication of the specific MSS.

The NAS/Authenticator located in ASN GW (1) will provide keying material to BSs/ASN GWs during MSS HO within intra-/inter-ASN.

When another MSS, initially entered the network through BS (c) connects to ASN GW (2), it will use the Authenticator located in ASN GW (2).

Mobility in this example is similar to the mobility scenario described for the previous example with the difference that further re-anchoring of ASN GW EP occurs when appropriate (after PMIP client relocation to target ASN GW EP (ASN GW 2). Thus the steps of the method described in this example, are:

Step 1 (T1)—MSS works via BS (b) and ASN GW (1)

Step 2 (T2) (anchored HO)—MSS starts working via BS (c) and ASN GW (2) but the traffic flow is still anchored to ASN GW (1) which forwards it to ASN GW (2). Authenticator is located in ASN GW (1) and delivers the appropriate keying material to BS (c) (via ASN GW (2)).

Step 3 (T3) (ASN GW HO)—Anchored traffic relocation from ASN GW (1) to ASN GW (2) and traffic path optimization (using for example Client or Proxy MIP process). ASN GW (2) becomes a pivot. Since this process is performed after Anchored Handover, the signaling for ASN GW Handover can take as long as necessary and has no impact on traffic flow.

Soon after uncontrolled HO takes place one should be able to recognize through which ASN GW DP (and the respective NAS/Authenticator) was the MSS initially authenticated, as the corresponding keying information is to be found thereat. One possible solution provided by the present invention, is, that the MSS is anchored to the same NAS/Authenticator until the new Authentication process continues over another ANS GW (with it's associated NAS)—such as in uncontrolled HO scenario.

Figure 6A:
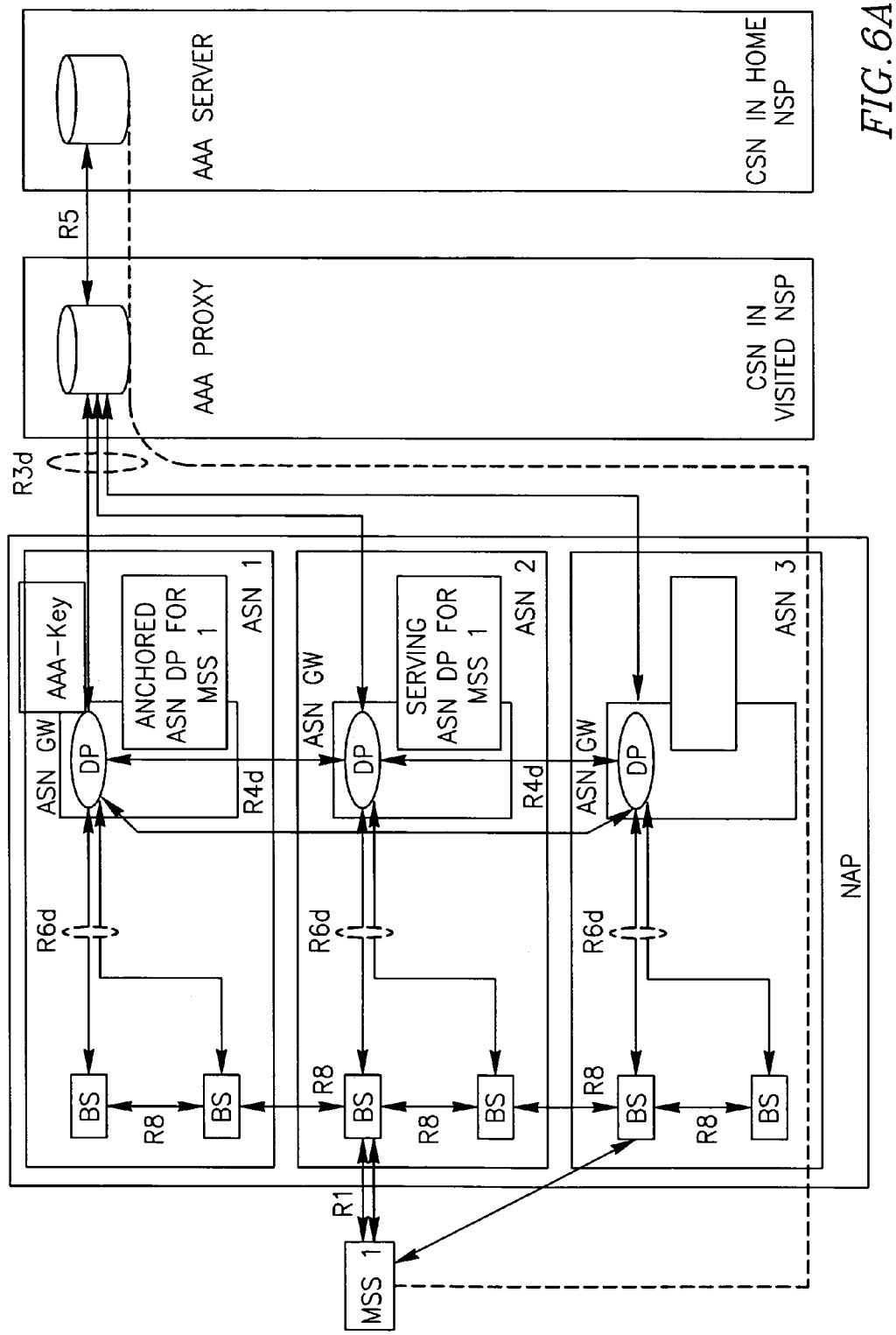
FIGS. 6A and 6B—present schematic illustrations of embodiments of the present invention where the NAS/Authenticator is a single entity (per NAP) for any specific MSS.
Figure 6B:
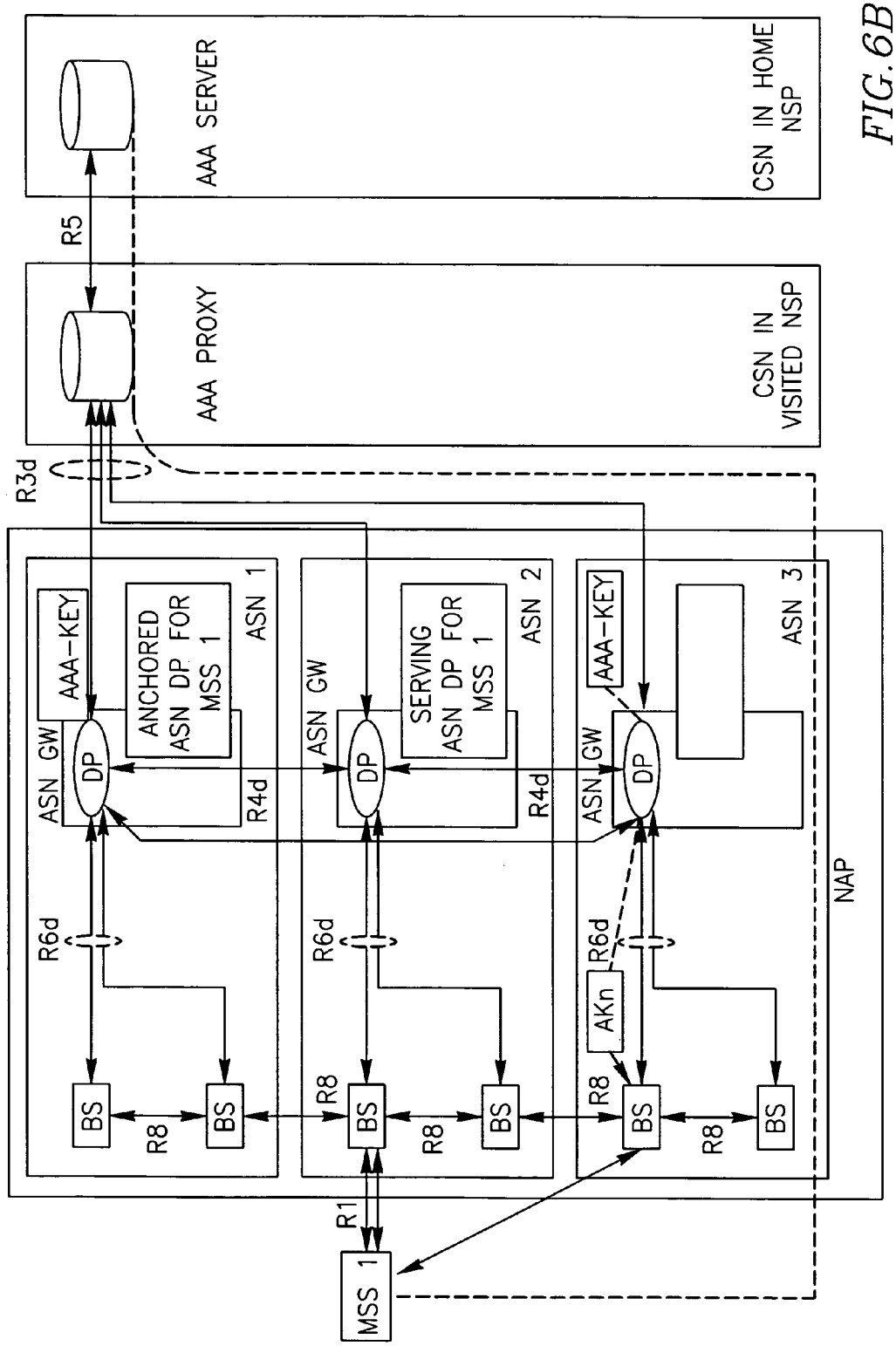
Figure 8:
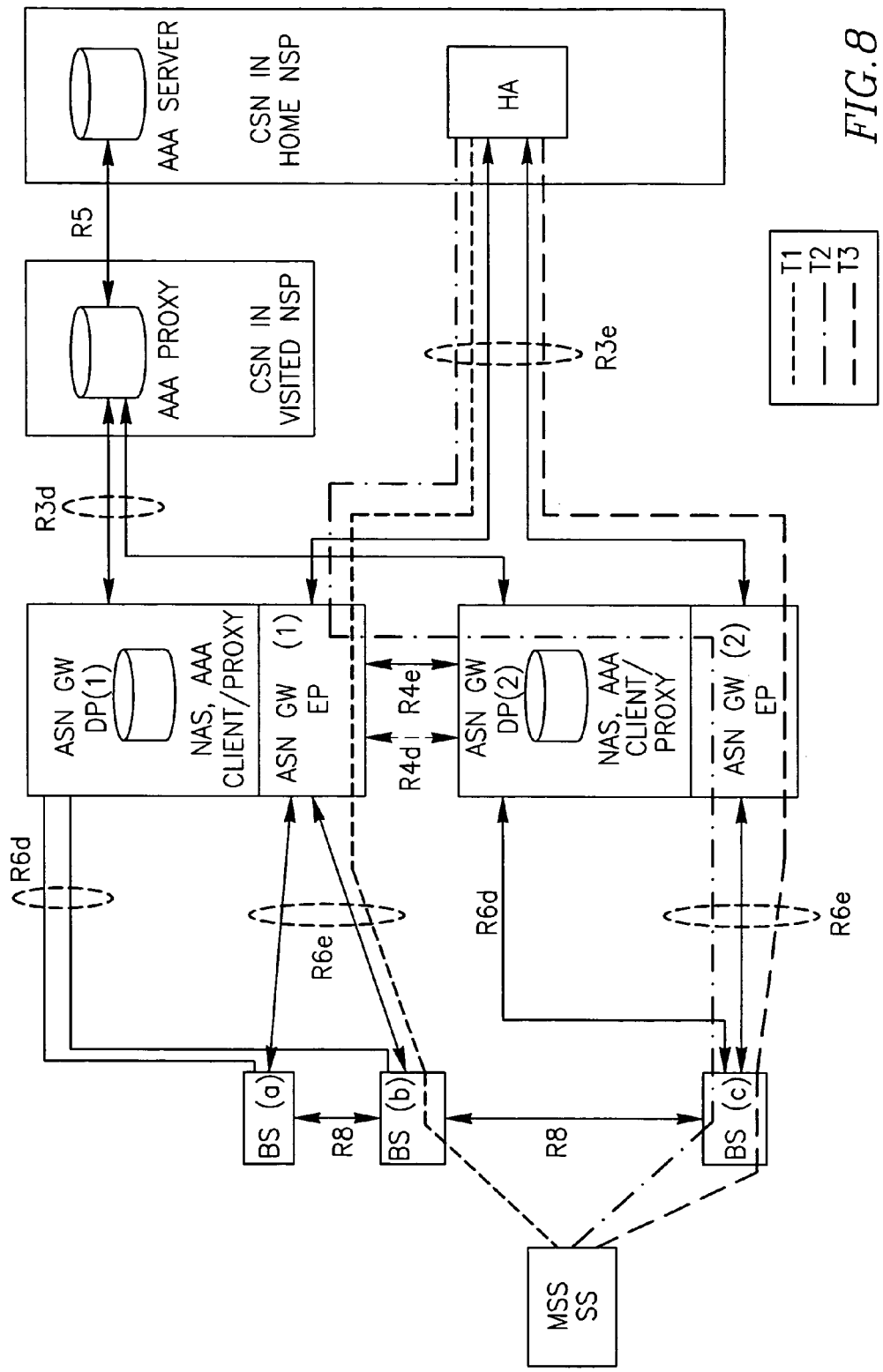
FIG. 8 illustrates an example of handling mobility in case of having a delayed handover according to an embodiment of the present invention.

Let us now consider FIG. 8, illustrating with more details part of FIGS. 6A and 6B, as an example of handling a mobility scenario, where there is a delayed handover of the $R_3$ link. As may be seen in this example, the terminal is initially (time T1) connected to BS(a) with $R_3$ anchored to ASN-GW(a). During T2 the terminal reconnects to BS(b) while the $R_3$ link still anchored to ASN-GW(a). Data is forwarded from ASN-GW (a) to ASN-GW(b) via the $R_4$ interface.

Now, there are a number of options to provide the necessary security for the above process.

Security Option 1

Authenticator(AAA-client) is always located at the ASN-GW connected to the MSS.

At T1 the authenticator is anchored at ASN-GW(a).

At T2 the authenticator is relocated to ASN-GW(b).

Security Option 2

Authenticator remains anchored at ASN-GW(a)

At Time T1, the data path for carrying traffic to/from the MSS is still anchored at ASN-GW(a), where the authenticator remains at ASN-GW(a). This is the intra-NAP, intra-ASN, or "Anchored Handover" case. The link for data forwarding stays anchored at the same ASN-GW(a). The authentication uses the same authenticator for fast handover. Of course, this does not necessarily mean that the MSS and the new BSb should use the same access authentication key as before. The key hierarchy which is rooted at ASN-GW(a), allows new key to be established between MSS and BSb.

Figure 9:
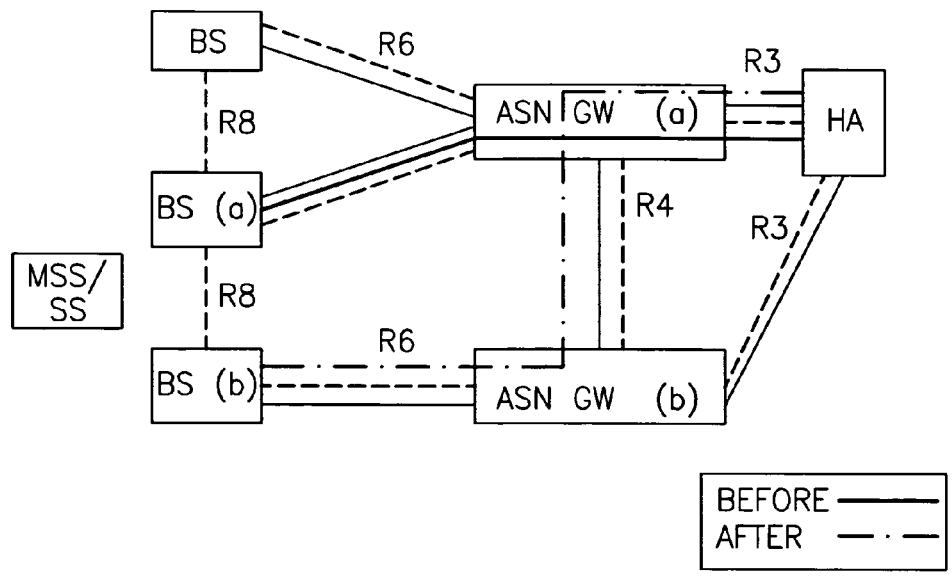
FIGS. 9 and 10 illustrate another example of handling mobility according to an embodiment of the present invention.
Figure 10:
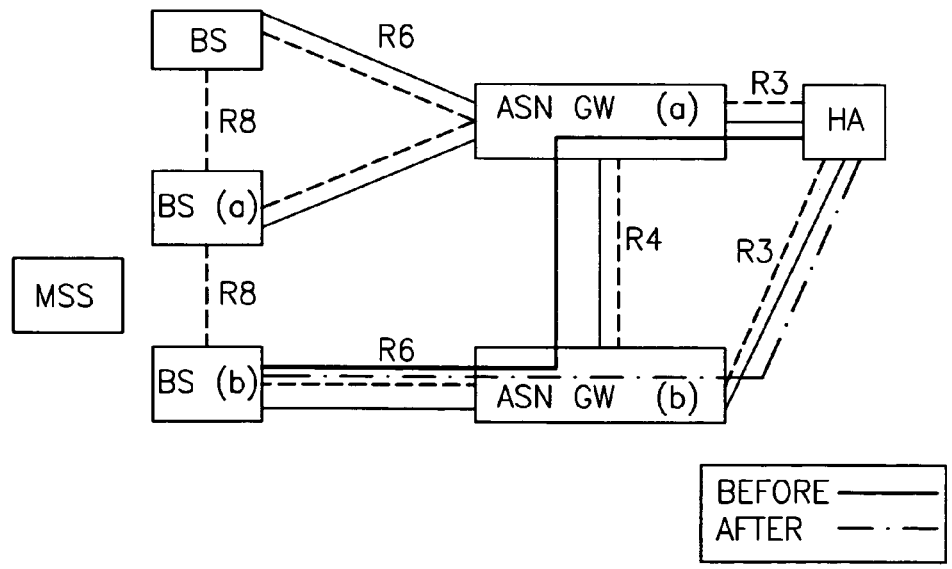

Let us now consider another example (FIGS. 9 and 10), illustrating a method of handling yet another mobility scenario, where there is re-anchoring of link $R_3$.

In this re-anchoring exemplified scenario the MSS does not change the BS but the R3 reference point is re-anchored from ASN-GW(a) to ASN-GW(b).

Initially, the MSS is connected to BS(b), and R3 link is anchored to ASN-GW(a). Data is then forwarded from ASN-GW(a) to ASN-GW(b) over the R4 reference point. After the handover, The MSS is still connected to BS(b) but R3 link is re-anchored to ASN-GW(b).

Again, there are a number of options for providing the necessary security when the above described handover process takes place.

Security Option 1

Authenticator (AAA-client) is always located at the ASN-GW connected to the MSS. In the Re-anchoring scenario, the authenticator still remains at ASN-GW(b).

Security Option 2

At Time T2, MSS determines (or alternatively the network informs the MSS) to re-anchor to new ASN-GW(b). This is the R3MM or "ASN-GW Handover" case. The data forwarding path now changes and the ASN-GW(b) becomes the pivot. Since the traffic is conveyed in a way that allows maintaining the already in-place sessions after the anchored handover, the signaling associated with the ASN-GW handover, may last as long as necessary without any impact on the overall performance. Even if it is required to carry out a full authentication in order to set up a new authenticator at ASN-GW(b), the result would not be detrimental to the data flow. When control messages finally set up the authenticator at ASN-GW(b), the MSS would need to do another access authentication handshake with BS(b) using newly derived key based on root key at ASN-GW(b). By this time, the R3MM signaling is established for the data path extending between CSN and ASN-GW(b). It would be advisable that the R4 data path remains up for a short period to deliver the packets in transit, before it can be torn down.

Security Option 3

Changing of ASN GW anchoring point due to MIP process may be unassociated with an Authenticator relocation. Thus, the AAA can be made unaware of the MSS movements (or handovers) within the same access network (or NAP).

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method for authenticating a mobile terminal in a first wireless network, the first network comprising a plurality of traffic conveying entities capable of conveying traffic to/from said mobile terminal, the method comprising the steps of:

transmitting a request for authenticating said mobile terminal in said first wireless network, wherein said first wireless network is operative to provide services at a location where said mobile terminal is currently present;

receiving said request at one base station out of a plurality of base stations associated with said first wireless network; and selecting an authentication access entity from among a plurality of authentication access entities associated with said first wireless network to be operative as a single authentication access entity for said mobile terminal, wherein said selected authentication access entity is operative to be in communication with said plurality of traffic conveying entities;

exchanging communications between said selected authentication access entity and an authentication server in a home network of said mobile terminal to authenticate said mobile terminal;

upon completion of authentication of said mobile terminal by the authentication server, allowing transmission and reception of communications by said mobile terminal via at least one of said plurality of traffic conveying entities and via at least one of said plurality of base stations, and using said selected single authentication access entity to authenticate said mobile terminal when traffic is conveyed to/from said mobile terminal operating within said first wireless network, via any other of said plurality of traffic conveying entities.

2. The method according to claim 1, wherein said single authentication access entity is associated with a first network access server that is operative to communicate with at least one of said plurality of first base stations.

3. The method according to claim 2, wherein said first network access server is an access service network gateway ("ASN GW").

4. The method according to claim 2, further comprising a step of initiating a hand over procedure to enable said mobile terminal currently serviced by a first base station to be serviced by a second base station, and wherein first access service network gateway is different from a second access service network gateway ("ASN GW") that said second base station is associated with.

5. The method according to claim 4, further comprising a step of informing said second base station that said single authentication access entity is comprised in said first ASN GW.

6. The method according to claim 4, further comprising a step of providing said second base station with indication of the location of said single authentication access entity.

7. The method according to claim 4, wherein said single authentication access entity is comprised in the first network access server, whereas traffic directed towards said mobile terminal is conveyed via a second network access server.

8. The method according to claim 4, further comprising the step that in the event of uncontrolled disconnection of the communication held with said mobile terminal occurs, said second base station initiates a transmission of a message, informing said single authentication access entity of the uncontrolled disconnection.

* * * * *

UNITED STATES PATENT AND TRADEMARK OFFICE
CERTIFICATE OF CORRECTION

PATENT NO. : 7,561,692 B2
APPLICATION NO. : 11/362372
DATED : July 14, 2009
INVENTOR(S) : Mark Altshuller et al.

Page 1 of 1

It is certified that error appears in the above-identified patent and that said Letters Patent is hereby corrected as shown below:

In the Specification
Column 12, line 12. after "work;" omit "and"
Column 12, line 29. "stations, and" should read --stations; and--

Signed and Sealed this
Twenty-second Day of October, 2013

Teresa Stanek Rea
*Deputy Director of the United States Patent and Trademark Office*